AUTOMATIC BACKGROUND LEVEL COMPENSATION
Filed July 26, 1968
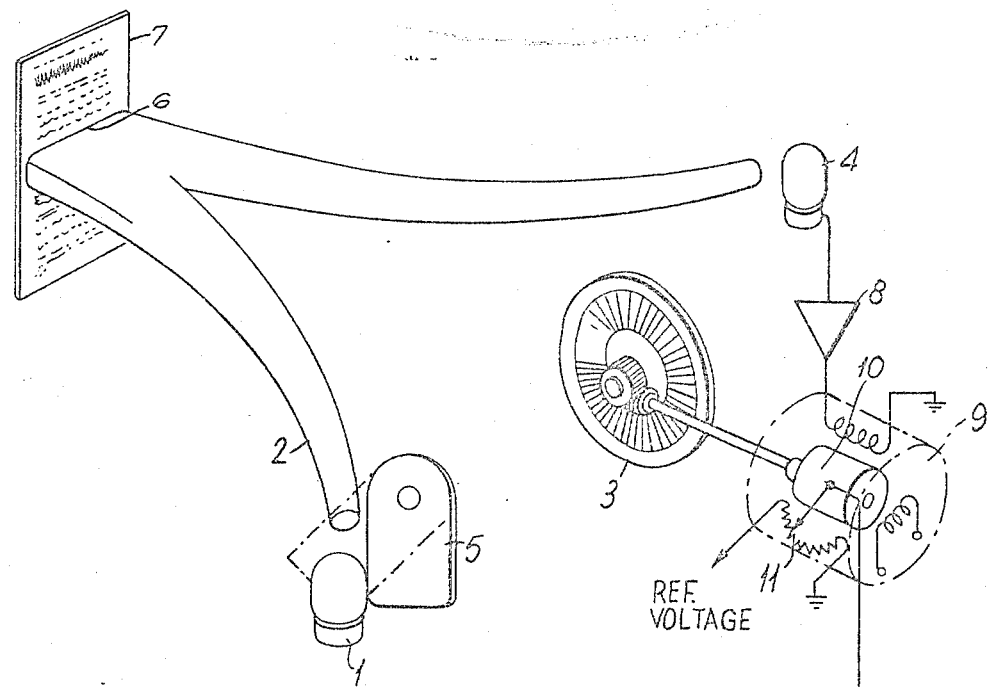
FIG.1.
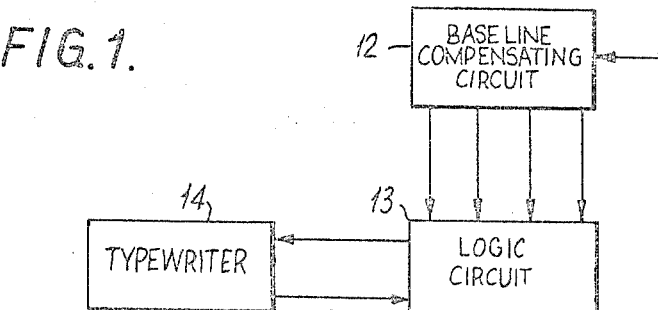

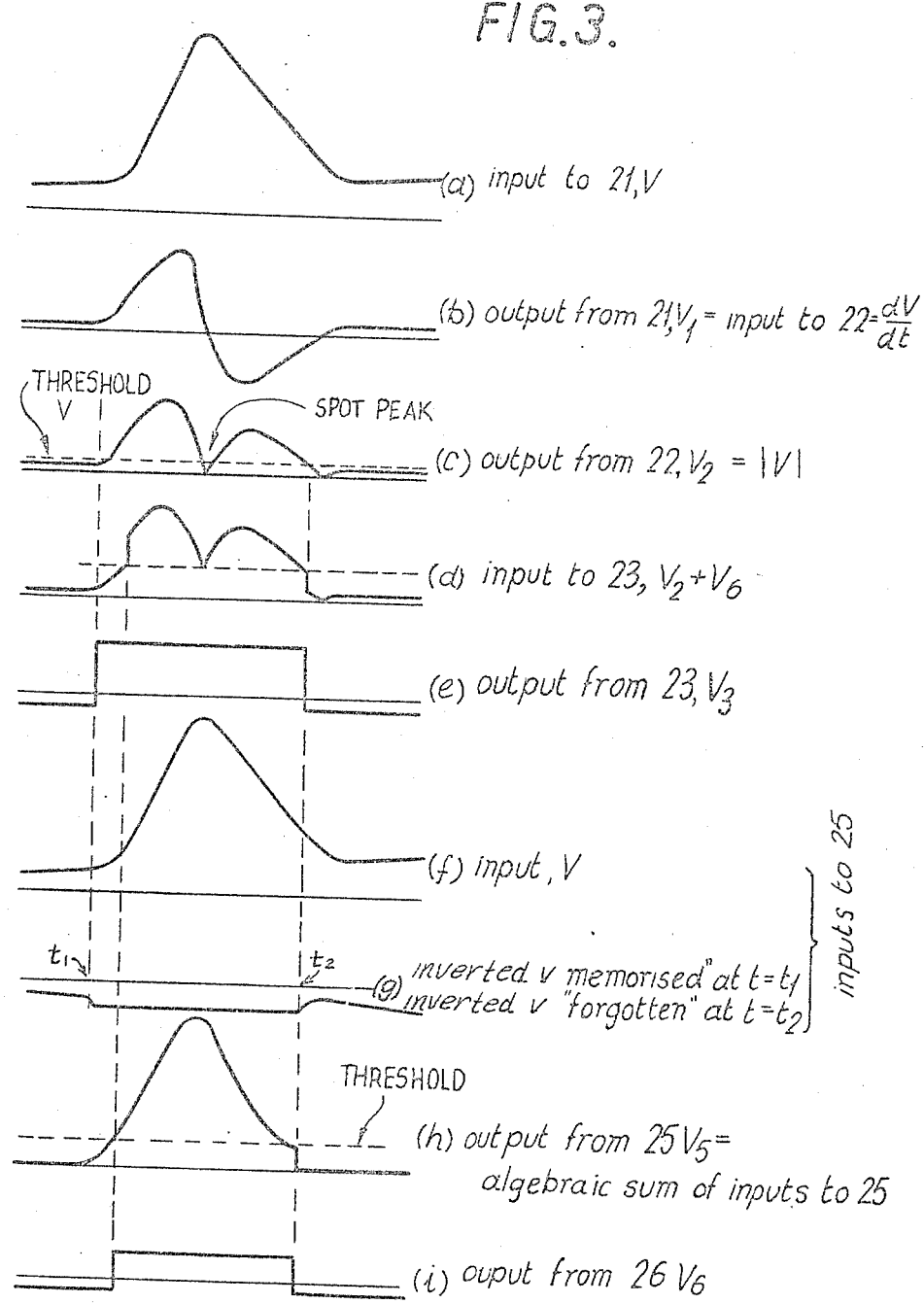

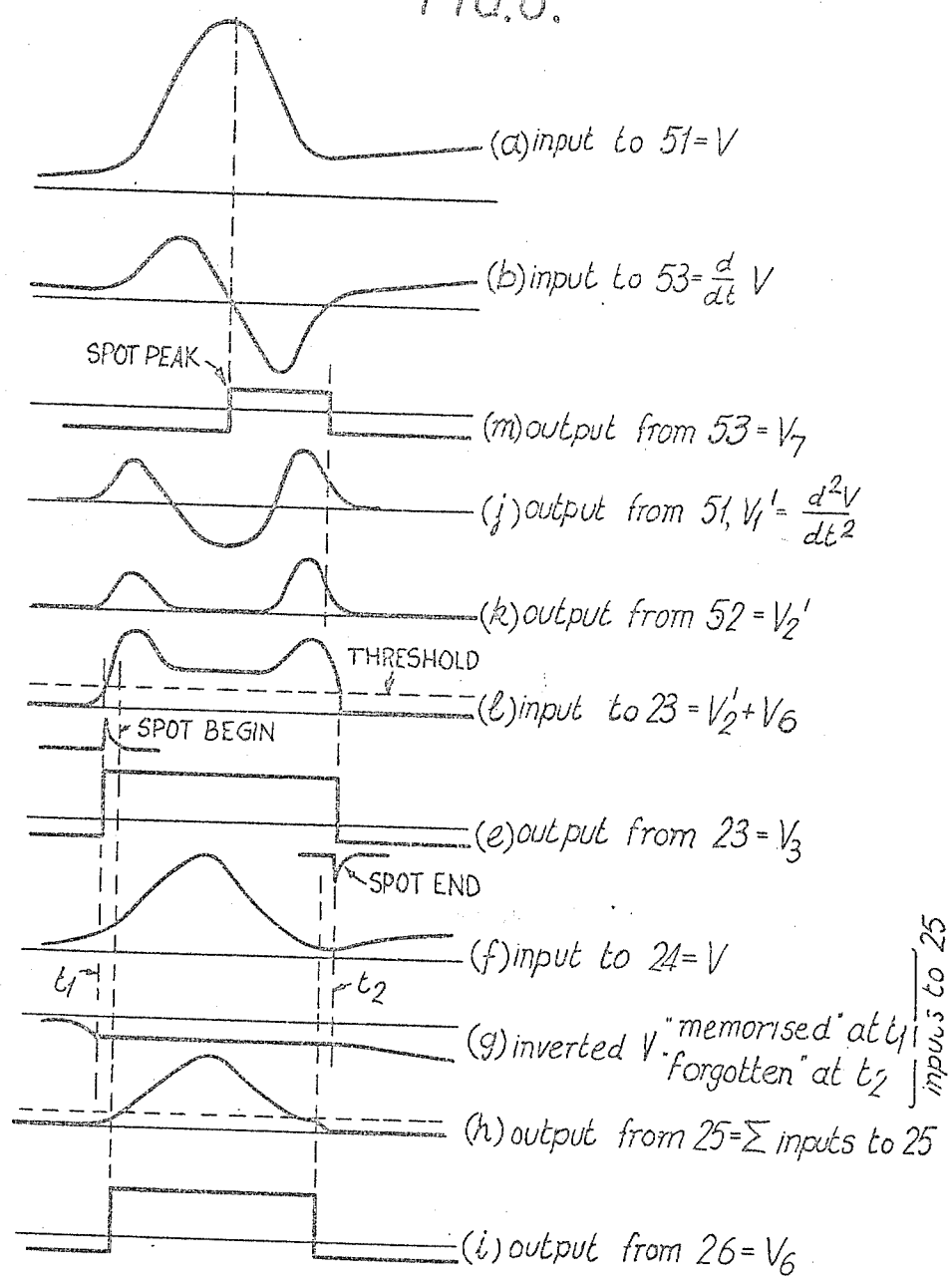

United States Patent Office  
3,525,869  
Patented Aug. 25, 1970

3,525,869
AUTOMATIC BACKGROUND LEVEL COMPENSATION
Roland Werner Gubisch, Lexington, Mass., assignor to National Research Development Corporation, London, England, a corporation of Great Britain
Filed July 26, 1968, Ser. No. 747,395
Claims priority, application Great Britain, July 31, 1967, 35,130/67
Int. Cl. G01n 21/30, 21/06; H01j 39/12
U.S. Cl. 250—214
6 Claims

ABSTRACT OF THE DISCLOSURE

There is described an apparatus for analysing a signal consisting of excursions from a nominally constant background level, in which the occurrence of an excursion from the background level of the signal is detected by sensing a change greater than a given level, in a differential co-efficient of a function representing the signal, and the actual background level of the signal is measured at the commencement of each excursion in the signal from the nominal background level, and used to derive a true reference level for the measurement of that excursion in the signal.

---

Figure 2:
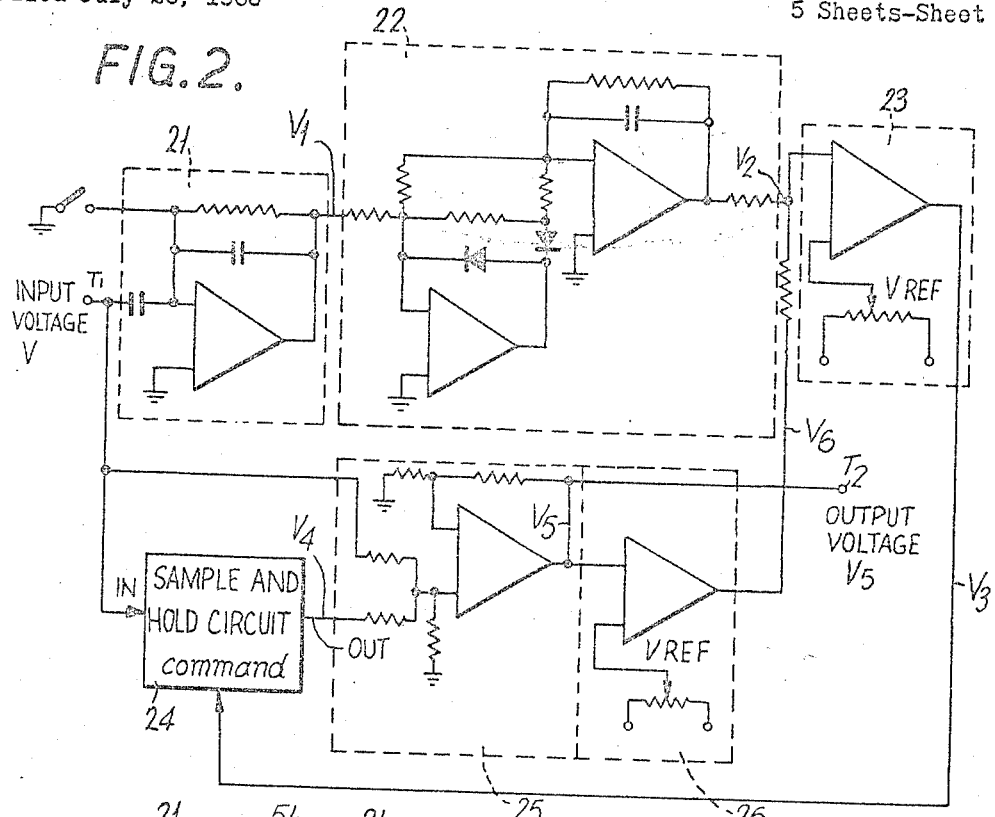

The present invention relates to apparatus for analysing signals comprising excursions from a nominally constant background level. The invention has utility particularly, but not exclusively, in connection with densitometers, that is devices that measure the variation of transmittance or reflectance of photographic or other records in which information is represented by variations in the optical properties of the recording medium.

In a known densitometer of the dual-beam, servo-balancing type, light from a light source is split into two beams of approximately equal intensity. One beam falls upon the sample to be measured and then upon a photo-multiplier. The other beam passes through a variable-density optical filter and then also falls upon the photo-multiplier. The two beams are alternately occulted, and as long as the intensities of the beams of light from the sample and the beam from the variable-density optical filter differ, the output from the photo-multiplier fluctuates. This fluctuating output is used to drive a motor that varies the optical density of the filter in such a manner as to lessen the magnitude of the fluctuations. An equilibrium condition is finally reached in which the intensities of the two beams are equal and the optical density of the filter is then equal to that of the sample. Should any change then occur in the optical density of the sample, the optical density of the filter will be varied automatically until balance is once more achieved.

When such an instrument is used to examine a thin layer chromatogram, the parameter that is measured is usually the reflectance rather than the transmittance, but the principle remains the same, and in this case the term "optical density" is interpreted in terms of the reflectance, a low reflectance being equivalent to a high optical density and vice-versa.

When a chromatogram for example is examined by such a densitometer, one of the measurements that are made is the integral optical density of each spot, that is, the density of the spot summed over its total area. To do this the instantaneous optical density of any area of spot must be added to the sum of the optical densities already recorded. Methods for doing this are well known but their accuracy depends upon there being a very uniform background intensity. If the background intensity of the chromatogram is not uniform then for accuracy the integral optical density must be set to zero immediately before each spot to be measured, the optical density of each spot then being measured with respect to the background that existed immediately before it.

With known densitometers a human operator is required to zero the counter that registers the integral optical density of each spot, and to adjust the densitometer continuously to compensate for variations in the background intensity.

It is an object of the present invention to provide apparatus for analysing signals comprising excursions from a nominally constant background level, wherein there is incorporated means for automatically performing such a compensating function.

According to the present invention such as an apparatus comprises means for producing a derivative signal representative of a differential co-efficient of the function represented by a signal to be analysed, and means for establishing as a reference level, for analysis of a parameter of an excursion in this signal to be analysed, the level of the signal to be analysed at the commencement of the excursion as determined by the occurrence of an excursion beyond a given level in the derivative signal.

Preferably the derivative signal is representative of the second differential co-efficient of the function represented by the signal to be analysed, and the apparatus also includes means for detecting the maximum value of the said function during an excursion in the signal to be analysed and the integral value of the said function over an excursion in the signal to be analysed.

Two embodiments of the invention will be described, by way of example with reference to the accompanying drawings, in which, FIG. 1 shows in diagrammatic form an automated densitometer embodying the present invention, FIG. 2 shows a schematic circuit diagram of a base line compensating circuit according to the present invention.

Figure 5:
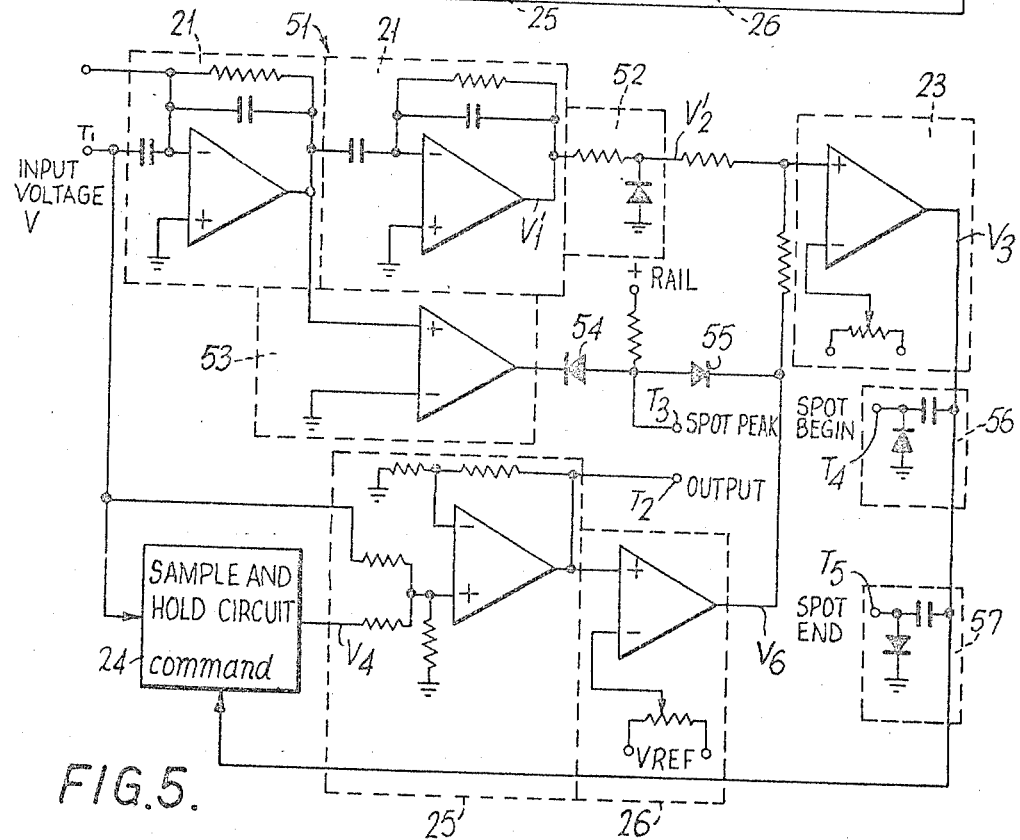
Figure 4:
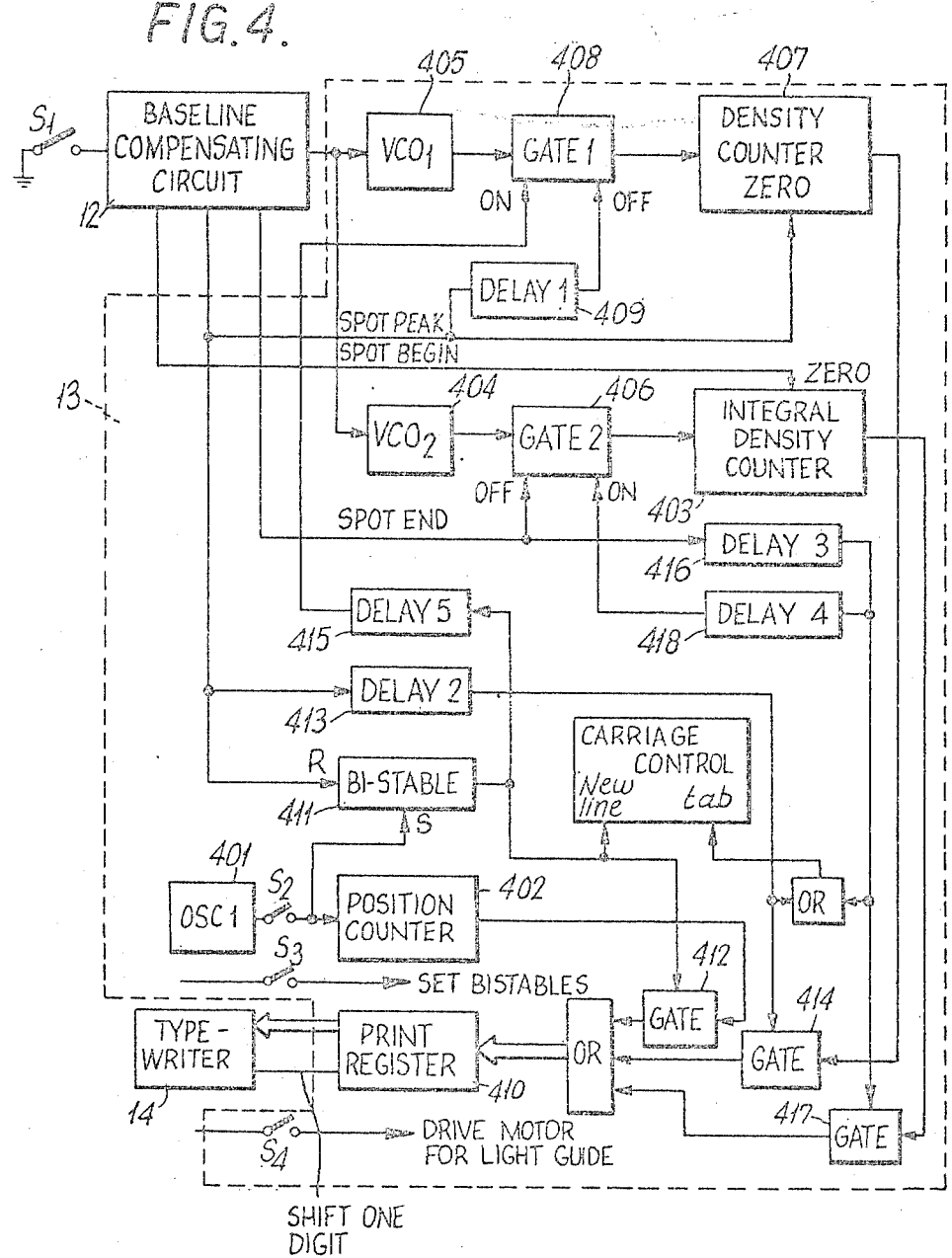

FIG. 3 shows the waveforms associated with the base line compensating circuit of FIG. 2, FIG. 4 shows in diagrammatic form the logic circuit shown in FIG. 1, FIG. 5 shows a schematic circuit diagram of a base line compensating circuit according to a preferred embodiment of the present invention, and, FIG. 6 shows the waveforms associated with the base line compensating circuit of FIG. 5.

With reference to FIG. 1, light from a source 1 falls upon an end of a flexible light guide 2 and also upon a variable-density optical filter 3 through which it passes to a photo multiplier 4. The flexible light guide 2 and filter 3 are alternately occulted by a shutter 5. The flexible light guide 2 consists of two bundles of glass fibres that are merged together to form the shape of a capital letter Y. Although the two branches of the flexible light guide 2 are circular in section, the end of the main part is made rectangular in section to effectively form a scanning slit 6. A chromatogram 7, or other sample to be analysed, is placed under the slit 6 in such a manner that the wider dimension of the slit extends across the sample. The slit 6 of the light guide 2 is moved uniformly along the chromatogram 7 and just above it by a motor (not shown) until the entire chromatogram has been scanned by light from the source 1 passing down one arm of the light guide 2. Light reflected from the chromatogram 7 is conveyed by the other arm of the light guide 2 to the photo-multiplier 4. If the intensity of the light from the light guide 2 is different to that passing through the filter 3 to the photo-multiplier 4 the output from the photo-multiplier 4 fluctuates at the frequency of oscillation of the shutter 5. This fluctuating output is amplified by an operational amplifier 8 and is used to drive a servo motor 9, which in a manner well known in the art, alters the optical density of the filter 3 until the intensities of the two beams of light falling upon the photo-multiplier 4 are equal and the fluctuations in output of the photo-multiplier cease. The optical density of the filter 3 is then equal to that of the chromatogram 7. The movement of the armature 10 of the servo-motor 9 from its rest position when no chromatogram is being scanned by the slit 6 is a measure of the optical density of a spot on a chromatogram 7. A potentiometer 11 coupled to the armature 10 produces a voltage that is proportional to the angular position of the armature 10, and hence to the instantaneous optical density of chromatogram 7. This voltage is fed to a base line compensating circuit 12, to be described more fully later, which produces a signal proportional to the instantaneous density of a spot relative to the background density of the chromatogram 7 at the position of the spot, and three operating signals or "pulses," a spot-begin pulse, a spot-peak pulse and a spot-end pulse. These signals are treated in a logic circuit 13, also to be described more fully later, and a record of the chromatogram 7 is printed by a typewriter 14.

The shutter may be placed at either end of the flexible light guide 2 but when it is at the end of the flexible light guide 2 nearer to the source 1, it has the advantage of rendering the apparatus insensitive to the effects of stray light falling upon the chromatogram 7.

When the chromatogram 7 is scanned by the flexible light guide 2, as the slit 6 comes to a spot on the chromatogram 7, a slight increase in the optical density occurs. It is this smooth increase in density to which the base line compensating circuit 12 is sensitive, and which it uses to derive a reference level in relation to which the spot may be measured. This reference level is not necessarily constant, but as it is derived at the commencement of each spot, a true measure of the increase in optical density due to the spot may be obtained.

The base line compensating circuit is shown diagrammatically in FIG. 2, in which the triangular symbols represent operational amplifiers.

A differentiator 21 has applied to it at terminal $T_1$ a voltage V from the potentiometer 11, not shown, and generates a voltage $V_1$ proportional to the rate of change of V, which is applied to a circuit 22 that produces an output voltage $V_2$ that is equal to the numerical value of $V_1$. $V_2$ is applied to a circuit 23 which develops an output voltage $V_3$ which has a first or second value according as to whether $V_2$ is above or below a threshold or reference voltage $V_{ref}$.

$V_3$ is applied to a sample-and-hold circuit 24, to which V is also applied. Circuit 24 can either act as an amplifier of gain $-1$ or as a memory, so that its output voltage $V_4$ can either follow its input voltage V but of opposite sign, or can remain at a continuous level. $V_4$ and the original voltage V are applied to an adding circuit, which produces a final output voltage $V_5$ at terminal $T_2$ that is the algebraic sum of V and $V_4$. Circuit 26 is identical to circuit 23 and by producing a voltage $V_6$ whenever $V_5$ is greater than zero, which is added to $V_2$ to prevent $V_2$ from falling below $V_{ref}$ during the scanning of a spot, operates so as to prevent confusion between the zero value of $V_1$ that occurs at the centre of a dark spot and that which occurs between dark spots.

The operation of the circuit 12 is best understood with reference to FIG. 3 which shows the voltage waveforms that are produced within the base line compensation circuit 12 as a spot is scanned by the slit 6. As the slit 6 begins to scan the spot the voltage V begins to rise (curves $a$ and $f$) and so do both voltages $V_1$ and $V_2$ (curves $b$ and $c$). Initially $V_2$ is equal to $V_1$ both in sign and magnitude. Until $V_2$ exceeds the threshold voltage $V_{ref}$, $V_3$ (curve $d$) remains at its first value, and circuit 24 acts as an amplifier of gain $-1$ and $V_4$ is equal and opposite to V (curve $g$) and $V_5$, which is the algebraic sum of V and $V_4$, is zero (curve $h$). As V rises more steeply, so do $V_1$ and $V_2$, until $V_2$ reaches $V_{ref}$, $V_3$ then changes to its second value, producing an effective "spot-begin" pulse (curve $e$) and causing circuit 24 to maintain $V_4$ at the value it had reached when the change in value of $V_3$ occurred (curve $g$). As V continues to increase, $V_5$ no longer remains zero but will be the net increase in V above the maintained value of $V_4$ (curve $g$) which represents the background level of optical density at the beginning of the spot. When the slit 6 scans past the centre, or point of maximum density, of the spot, $V_1$ drops to zero and then rapidly increases again, but with a negative sign, as may be seen from curve $3b$. $V_2$ also drops to zero at this point before increasing again, but its value remains positive (curve $c$). This dip in the value of $V_2$ forms an effective "spot-peak" pulse. The input voltage to circuit 23 however, does not drop to zero at the centre of the spot as it is the sum of $V_2$ and $V_6$, the output of circuit 26, (curve $d$). $V_6$ has the form shown in curve $i$.

As the measured optical density represented by $V_5$ drops to zero, the voltage $V_6$ reverts to its lower value, and when $V_2$ also drops below its threshold value, $V_3$ falls to its original value, thus creating a "spot-end" pulse. Circuit 24 then reverts to being an amplifier of gain $-1$ and $V_5$ is maintained at zero until the slit 6 begins to scan another spot.

The logic circuit 13 controls the operation of the densitometer; it is shown symbolically in FIG. 4 and operates as follows:

A switch $S_1$ is closed while the chromatogram 7 is being moved into position. When the chromatogram 7 is correctly positioned (as determined by a microswitch or photocell, not shown), switches $S_2$, $S_3$ and $S_4$ are closed and switch $S_1$ is opened. When closed, switch $S_2$ connects pulses of fixed frequency from an oscillator 401 to a binary-coded decimal position counter 402, the content of which is proportional to the time elapsed from the moment when the flexible light guide 2 begins to move and hence to the distance moved by the slit 6 from its starting position. Switch $S_3$ sets all bistables and gates to their correct initial states, and switch $S_4$ causes a motor (not shown) to move slit 6 uniformly across the chromatogram 7. When slit 6 arrives at the beginning of a spot, the "spot-begin" pulse from the base line compensating circuit 12 is used to set an integral density counter 403 to zero. Simultaneously, $V_5$ begins to rise above zero. This voltage is applied to two voltage-controlled oscillators 404 and 405. Each oscillator generates at its output a train of pulses whose frequency is exactly proportional to the input voltage; however, the oscillator 405 is adjusted to operate at a higher frequency than the oscillator 404 for the same input voltage. The pulses from the oscillator 404 are applied to the integral density counter 403 through the gate 406, and the content of the integral density counter 403 is thus proportional to the integrated product of optical density and time, that is, distance along the chromatogram.

The pulses from oscillator 405 are applied to a density counter 407 through a gate 408.

As the slit 6 passes the point of maximum optical density, the "spot-peak" pulse from the base line compensating circuit 12 initiates two sequences of events.

Firstly, the contents of the density counter 407 are set to zero, the gate 408 then being opened. After a period determined by a delay 409, the gate 408 is closed and the counter 407 records the total number of pulses that have been applied to it during the period beginning with the occurrence of the "spot-peak" pulse and ending with the closing of the gate 408.

The combination of the oscillator 405, the counter 407 and the gate 408 acts as a simple analogue-to-digital converter to convert the voltage proportional to the maximum density of a spot into binary-coded decimal digits.

Secondly the "spot-peak" pulse causes the existing contents of the counter 402 to be transferred into a print register 410 and printed by the typewriter 14. The bistable 411 and a gate 412 act to cause the transfer to be made when none of the digits is changing.

After a time interval set by a delay 413, a gate 414 is opened and the contents of the counter 407 is transferred to the print register 410 and printed out, by the typewriter 14. After a further interval determined by a delay 415, the gate 408 is opened readying it for the occurrence of the next spot-peak pulse. The print register 410 acts simply as a buffer storage element which is read out to the typewriter 14 serially (that is, digit-by-digit), and which can be loaded either in series or in parallel.

As the slit 6 passes over the end of a spot, the "spot-end" pulse closes the gate 406 so that the content of the counter 403 remains fixed. After a pause due to the delay 416, and sufficient to allow all previous typing by the typewriter 14 to be completed, the gate 417 is opened and the final content of the counter 403 is transferred to the print register 410, and the typewriter 14. After a further interval due to a delay 418 the gate 406 is opened to make the counter 403 ready for the occurrence of the next dark spot.

When slit 6 has traversed the entire length of the chromatogram 7 switch $S_1$ is closed, and switches $S_2$, $S_3$ and $S_4$ are opened and the light guide 2 is returned to its starting position to begin another sample.

The typewriter 14 prints a record that is in three columns: a position column in which the content of the position counter 402 is recorded each time it is fed into the print register 410, a density column in which the content of the density counter 407 is similarly recorded, and an integral density column, in which the content of the integral density counter 403 is also recorded. This format enables the typewriter 14 to print two or more pairs of numbers in the position and density columns while leaving the integral density column blank. This enables incompletely resolved spots which have well-defined positions and maxima but have dark areas in common, to be measured.

A preferred form of the base line compensating circuit 12 is shown in FIG. 5, in which components similar to those of the embodiment of FIG. 2 have similar reference numerals.

In this embodiment the second derivative of V with respect to time $V_1'$ is sensed, as this enables the beginning and end of a spot to be determined with greater precision.

This second derivative is produced by a circuit 51 that comprises two of the circuits 21 of the embodiment of FIG. 2 connected in series. As a result of this modification it is possible to replace the circuit 22 of the embodiment of FIG. 2 by a diode 52, which merely serves to prevent the output $V_1'$ of 51 from becoming negative. However, this means that it is no longer possible to derive the spot peak from the signal applied to circuit 23. The spot peak is now taken to be when the first derivative of V crosses zero. To observe this, a sensor 53 is connected intermediate of the two differentiating circuits 21 of circuit 51, and is so gated by diodes 54 and 55 as to produce a "spot-peak" pulse at a terminal $T_3$ only when $dv/dt$ approaches zero from a positive value. "Spot-begin" and "spot-end" pulses are produced at terminals $T_4$ and $T_5$ by circuits 56 and 57 respectively.

The remainder of the circuit functions exactly as before.

FIG. 6 shows the waveforms of the voltages that occur within the base line compensating circuit of FIG. 5. The waveforms that are the same as those in FIG. 3 have the same references. As may be seen from curve $j$ which shows the waveform of $V_1'$, the occurrence of the spot peak could be inferred from it, but the accuracy of such a method is likely to be less than using circuit 53 to generate a spot peak pulse an edge of which coincides with $dv/dt$ crossing zero from a positive direction as shown in curve $m$.

I claim:
1. Apparatus for analyzing signals comprising excursions from a nominally constant background level, the apparatus incorporating analyzing means, responsive to the instantaneous magnitude of an applied signal, for determining at least one parameter of each excursion in a signal to be analyzed, wherein the improvement comprises:

means for producing a derivative signal representative of a differential coefficient of a function represented by the signal to be analyzed;

means for detecting the commencement of an excursion in the signal to be analyzed by sensing the occurrence of an excursion beyond a given level in said derivative signal; and means, responsive to operation of the detecting means, for applying to the analyzing means a signal which throughout each excursion in the signal to be analyzed has an instantaneous magnitude equal to the difference between
(a) the instantaneous magnitude of the signal to be analyzed and
(b) the magnitude of the signal to be analyzed at the commencement of the relevant excursion.

2. Apparatus according to claim 1 wherein the derivative signal is representative of the second differential coefficient of said function.

3. Apparatus according to claim 1 wherein said analyzing means is operative to determine an extreme value of said function during an excursion in the signal to be analyzed.

4. Apparatus according to claim 1 wherein said analyzing means is operative to determine the integral value of said function during an excursion in the signal to be analyzed.

5. A densitometer comprising means for generating a signal related to an optical parameter of a specimen to be analyzed, said signal comprising excursions from a nominally constant background level, and apparatus according to claim 1 for analyzing said signals.

6. In a signal analyzing apparatus including analyzing means designed to detect at least the instantaneous magnitude of signal excursions within a composite input function consisting of said signal excursions and a superimposed nominally constant background level, an improvement providing automatic compensation for variations in the nominally constant background level, said improvement comprising:

detecting means to detect the beginning of a signal excursion; and compensating means which provide a compensated signal to said analyzing means by responding to said detecting means and causing a constant compensation value equal to the instantaneous value of said composite input function at the beginning of said signal excursion to be subtracted from the instantaneous value of said composite input function during said signal excursion.

References Cited

UNITED STATES PATENTS

| 2,832,108 | 4/1958 | Vossberg | 250—214 X |
| 2,873,312 | 2/1959 | Moe | 250—214 X |
| 2,993,121 | 7/1961 | Esher | 250—214 X |
| 3,090,870 | 5/1963 | Ruckert | 250—214 X |

ARCHIE R. BORCHELT, Primary Examiner

T. N. GRIGSBY, Assistant Examiner

U.S. Cl. X.R.

250—219; 356—201